(12) United States Patent
Isberg et al.

(10) Patent No.: US 7,068,797 B2
(45) Date of Patent: Jun. 27, 2006

(54) MICROPHONE CIRCUITS HAVING ADJUSTABLE DIRECTIVITY PATTERNS FOR REDUCING LOUDSPEAKER FEEDBACK AND METHODS OF OPERATING THE SAME

(75) Inventors: Peter Isberg, Lund (SE); Stefan Gustavsson, Helsingborg (SE)

(73) Assignee: Sony Ericsson Mobile Communications AB (SE)

( * ) Notice: Subject to any disclaimer, the term of this patent is extended or adjusted under 35 U.S.C. 154(b) by 100 days.

(21) Appl. No.: 10/456,764

(22) Filed: May 20, 2003

(65) Prior Publication Data

US 2004/0234084 A1 Nov. 25, 2004

(51) Int. Cl.
*H04R 3/00* (2006.01)

(52) U.S. Cl. ........................................ 381/92; 381/94.7

(58) Field of Classification Search ............... 381/83, 381/93, 92, 94.7; 379/406.01, 406.15, 406.08
See application file for complete search history.

(56) References Cited

U.S. PATENT DOCUMENTS

| 5,384,843 | A * | 1/1995 | Masuda et al. | 381/92 |
| 6,549,627 | B1 * | 4/2003 | Rasmusson et al. | 381/92 |
| 6,760,450 | B1 * | 7/2004 | Matsuo | 381/92 |
| 2001/0028720 | A1 * | 10/2001 | Hou | 381/92 |
| 2003/0039353 | A1 * | 2/2003 | Matsuo | 379/406.01 |

FOREIGN PATENT DOCUMENTS

WO WO 01/24575 4/2001

OTHER PUBLICATIONS

International Search Report corresponding to PCT/EP2004/003054; Date of Mailing: Jun. 28, 2004.
Kuo et al., "Acoustic Noise and Echo Cancellation Microphone System for Videoconferencing," *IEEE Transactions on Consumer Electronics*, 41(4): 1150-1158 (1995).

* cited by examiner

*Primary Examiner*—Brian T. Pendleton
(74) *Attorney, Agent, or Firm*—Myers Bigel Sibley & Sajovec, PA

(57) ABSTRACT

A microphone circuit includes a first microphone, a second microphone, an adjustable delay unit, and a combiner. The first microphone generates a first microphone signal that includes a contribution associated with an output signal that is generated by a loudspeaker in response to an input signal. The second microphone generates a second microphone signal that includes a contribution associated with the output signal from the loudspeaker. The adjustable delay unit delays the second microphone signal relative to the first microphone signal by a delay value. The combiner combines the delayed second microphone signal and the first microphone signal to provide a combined microphone signal. The adjustable delay unit adjusts the delay value so as to reduce at least a portion of the contribution to the combined microphone signal that is associated with the output signal from the loudspeaker.

13 Claims, 4 Drawing Sheets

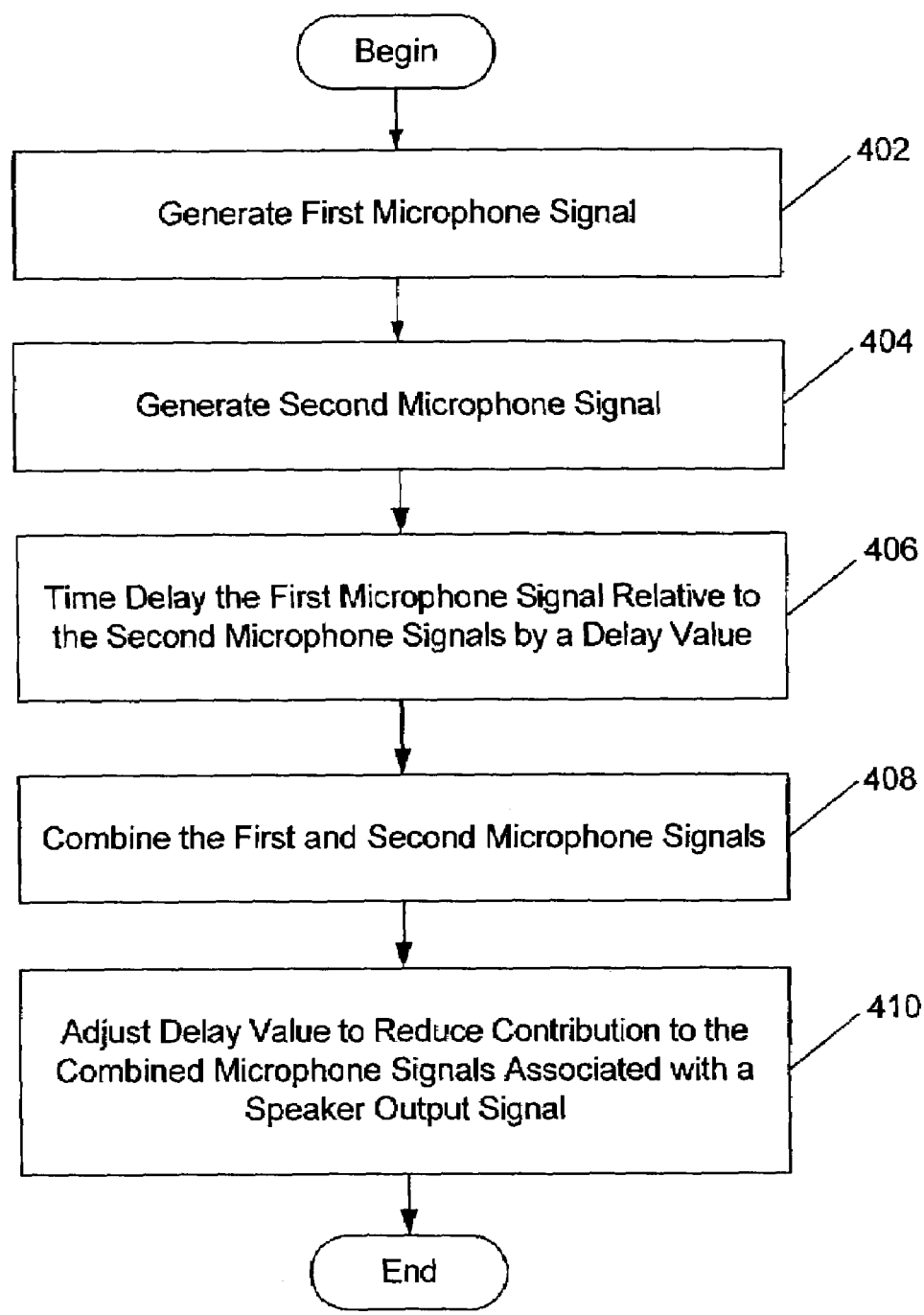

MICROPHONE CIRCUITS HAVING ADJUSTABLE DIRECTIVITY PATTERNS FOR REDUCING LOUDSPEAKER FEEDBACK AND METHODS OF OPERATING THE SAME

BACKGROUND OF THE INVENTION

The present invention relates to communication circuits that include a microphone and a loudspeaker, and, more particularly, to microphone circuits and methods for reducing loudspeaker feedback and echo.

When a communication system includes a microphone and loudspeaker that are closely spaced, some sound from the loudspeaker may be sensed by the microphone and fed back through the communication system. Such feedback can create an echo effect where, for example, a user's voice is fed back to the user and heard as an echo.

Echo cancellation circuits have been employed in communication systems, for example, in land-line phones, to reduce the feedback from a loudspeaker through a microphone. However, in noisy environments and/or where long time delays may occur in the feedback of sound, some echo cancellation circuits can negatively affect the quality of the sound that is provided by the microphone and can, for example, increase echoes or introduce unwanted noise.

SUMMARY OF THE INVENTION

Some embodiments of the present invention provide a microphone circuit that includes a first microphone, a second microphone, an adjustable delay unit, and a combiner. The first microphone generates a first microphone signal that includes a contribution associated with an output signal that is generated by a loudspeaker in response to an input signal. The second microphone generates a second microphone signal that includes a contribution associated with the output signal from the loudspeaker. The delay unit adjustably delays the second microphone signal by a delay value. The combiner combines the delayed second microphone signal and the first microphone signal to provide a combined microphone signal. The delay unit adjusts the delay value so as to reduce at least a portion of the contribution to the combined microphone signal that is associated with the output signal from the loudspeaker.

According to some further embodiments of the present invention, the adjustable delay unit may adjust a directivity pattern created by the first and second microphones based on the contribution to the combined microphone signal that is associated with the output signal from the loudspeaker. Accordingly, the adjustable delay unit may steer the directivity pattern so that a direction of reduced sensitivity of the microphones may be in the direction of the output signal from the loudspeaker.

The adjustable delay unit may adjust the delay value responsive to the input signal to the loudspeaker and the combined microphone signal. The combiner may remove at least a portion of one of the first and second microphone signals from the other one of the first and second microphone signals. The adjustable delay unit may adjust the delay value so as to minimize the contribution to the combined microphone signal that is associated with the output signal from the loudspeaker. The adjustable delay unit may remove at least a portion of the input signal to the loudspeaker from the combined microphone signal to provide a difference signal, and may adjust the delay value based on the difference signal. The microphone circuit may further include an inversion unit that inverts the input signal to the loudspeaker, and a summation unit that sums the inverted input signal and the combined microphone signal to provide the difference signal. The inversion unit may alternatively invert the combined microphone signal, and the summation unit may sum the inverted combined microphone signal and the input signal to the loudspeaker to provide the difference signal.

Other embodiments of the present invention provide a method of operating a microphone circuit. A first microphone signal is generated via a first microphone and a second microphone signal is generated via a second microphone. The first and second microphone signals include contributions associated with an output signal that is generated by a loudspeaker in response to an input signal. The second microphone signal is adjustably delayed by a delay value. The delayed second microphone signal is combined with the first microphone signal to provide a combined microphone signal. The delay value is adjusted based on the input signal to the loudspeaker and the combined microphone signal so as to reduce at least a portion of the contribution to the combined microphone signal that is associated with the output signal from the loudspeaker.

According to further embodiments of the present invention, the combining may remove at least a portion of one of the first and second microphone signals from the other one of the first and second microphone signals. The delay value may be adjusted to minimize the contribution to the combined microphone signal associated with the output signal from the loudspeaker. In other embodiments, the delay value may be adjusted to adjust a directivity pattern created by the first and second microphones based on a contribution to the combined microphone signal associated with the output signal from the loudspeaker.

In still other embodiments, the delay value may be adjusted based upon a difference signal formed by removing at least a portion of the input signal to the loudspeaker from the combined microphone signal. For example, the loudspeaker input signal maybe inverted and summed with the combined microphone signal to provide the difference signal. Alternatively, the combined microphone signal may be inverted and summed with the loudspeaker input signal to provide the difference signal.

Other embodiments of the present invention provide a computer program product that is configured to operate a microphone device. The computer program product includes a computer readable storage medium having computer readable program code embodied therein. The computer readable program code includes computer readable program code for adjustably delaying a second microphone signal from a second microphone by a delay value. The computer readable program code further includes computer readable program code for combining the delayed second microphone signal with a first microphone signal from a first microphone to provide a combined microphone signal, the first and second microphone signals including contributions associated with an output signal that is generated by a loudspeaker in response to an input signal. The computer readable program code further includes computer readable program code for adjusting the delay value so as to reduce at least a portion of a contribution to the combined microphone signal associated with the output signal from the loudspeaker.

In further embodiments of the present invention, the computer readable program code may adjust the directivity pattern created by the first and second microphones based on a contribution to the combined microphone signal associated with the output signal from the loudspeaker. The delay value may be adjusted based on the input signal to the loudspeaker and the combined microphone signal.

BRIEF DESCRIPTION OF THE DRAWINGS

FIG. 4 is a flowchart that illustrates operations for adjusting a directivity pattern created by two or more microphones in accordance with embodiments of the present invention.

DETAILED DESCRIPTION OF PREFERRED EMBODIMENTS

Figure 1:
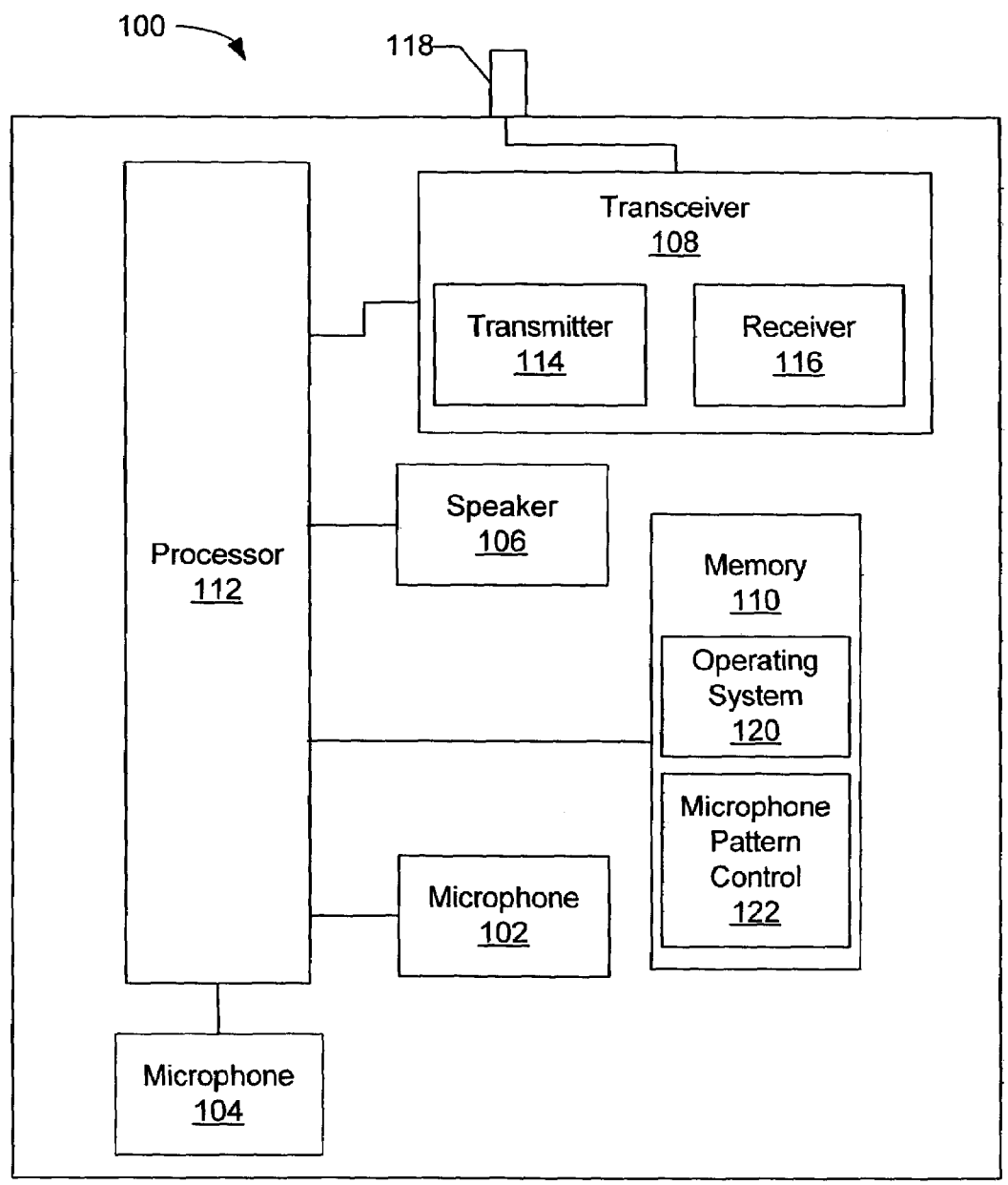
FIG. 1 is a block diagram that illustrates a mobile terminal in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof.

The present invention may be embodied as methods, circuits, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described herein in the context of reducing a loudspeaker signal that is fed back through two or more microphones in a mobile terminal. It will be understood, however, that the present invention may be embodied in other types of electronic devices that incorporate two or more microphones, such as, for example automobile speech recognition systems, hearing aids, a communication headset, etc. Moreover, as used herein, the term "mobile terminal" may include a headset, such as a Bluetooth headset, that can be used with a communication device, a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Referring now to FIG. 1, an exemplary mobile terminal 100, in accordance with some embodiments of the present invention, includes at least two microphones 102 and 104, a loudspeaker 106, a transceiver 108, and a memory 110 that communicate with a processor 112. The transceiver 108 includes a transmitter circuit 114 and a receiver circuit 116, which respectively transmit and receive radio frequency signals via an antenna 118. The mobile terminal 100 may be a cellular terminal in which communication is provide via radio frequency signals with base station transceivers, and in which both traffic and control signals (e.g., paging signals/messages for incoming calls) may be used to establish and maintain communication with another party or destination. The mobile terminal 100 may be, for example, a Bluetooth headset in which communication is provided by the Bluetooth protocol with another communication device, such as cellular terminal. The loudspeaker 106 and/or microphones 102 and 104 may be within a same housing as the other components of the mobile terminal 100, or they may be separate but electrically coupled to the mobile terminal 100.

The processor 112 communicates with the memory 110 via an address/data bus. The processor 112 may be, for example, a commercially available or custom microprocessor. The memory 110 is representative of one or more memory devices containing the software and data used to operate the mobile terminal 100. The memory 110 may include, but is not limited to, one or more read-only memories (ROM), erasable programmable ROMs (EPROM or Flash EPROM), battery backed random access memory (RAM), magnetic, optical, or other digital storage device, and may be separate from, or at least partially within, the processor 112.

A user may communicate through the mobile terminal 100 with another user or destination via conventional functionality provided by an operation system 120 in the memory 110. The processor 112 provides an input signal to the loudspeaker 106 to generate sounds, and the microphones 102 and 104 each provide microphone signals to the processor 112 based on incident sounds. Sounds from the loudspeaker 106 may be sensed by the microphones 102 and 104 and fed back to the processor 112. Such feedback from the loudspeaker 106 through the microphones 102 and 104 may be particularly pronounced when the loudspeaker 106 and the microphones 102 and 104 are closely spaced together and/or when the loudspeaker 106 is utilized at a high volume, such as in a hands-free speaker phone.

Figure 2:
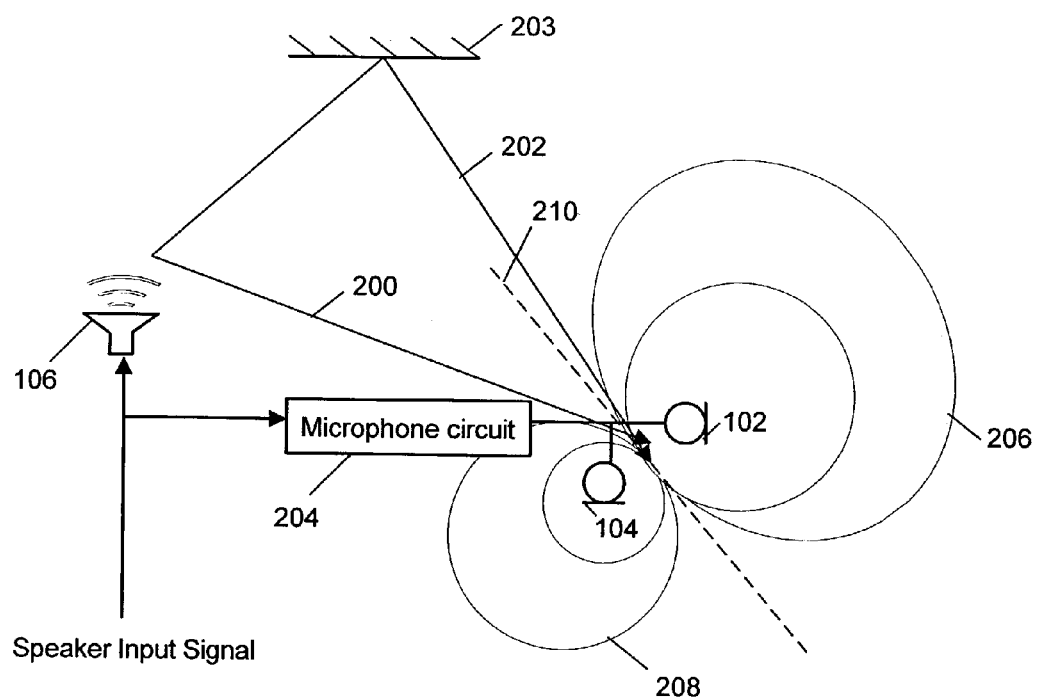
FIG. 2 is a block diagram that illustrates a microphone circuit that is used in the presence of a loudspeaker in accordance with embodiments of the present invention.

As illustrated in FIG. 2, an output signal from the loudspeaker 106 can become coupled to the microphones 102 and 104 by a direct path 200 and by a indirect path 202 whereby the output signal reflects from an object 203. Accordingly, as the mobile terminal 100 and/or adjacent objects move, the magnitude and direction by which a primary portion of the output signal from the loudspeaker 106 is incident to the microphones 102 and 104 can change. According to embodiments of the present invention, the mobile terminal includes a microphone circuit 204 that adjusts a directivity pattern of the sensitivity of the microphones 102 and 104, illustrated by the sensitivity patterns 206 and 208 (e.g., polar patterns), so that the microphones 102 and 104 are less sensitive in the direction of a primary portion of the output signal from the loudspeaker 106, illustrated by a notch axis 210. For the mobile terminal 100 illustrated in FIG. 1, a microphone circuit may be provided by the processor 112 operating according to microphone pattern control software 122 in the memory 110.

Figure 3:
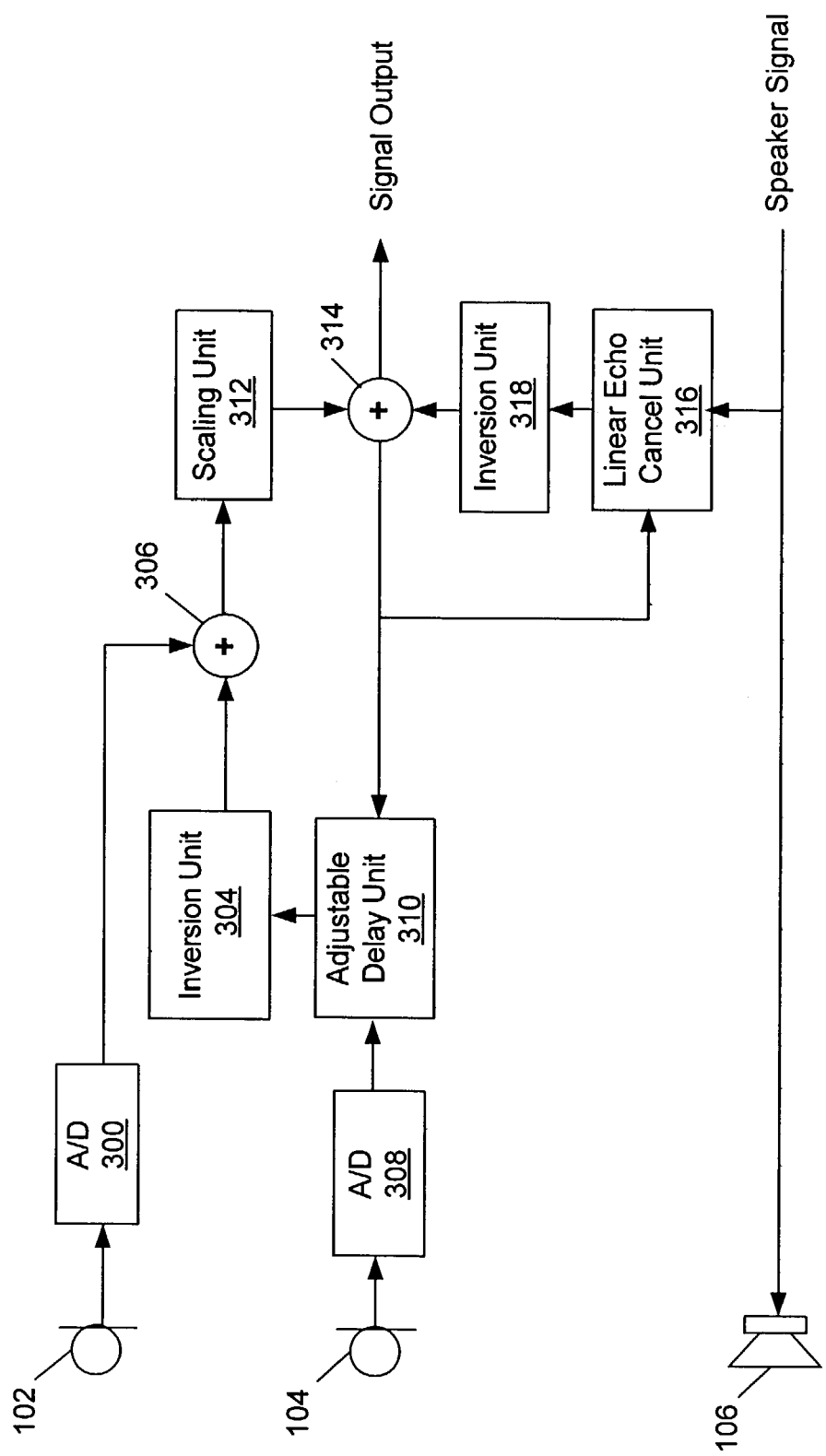
FIG. 3 is a block diagram that illustrates a microphone circuit that is used in the presence of a loudspeaker in accordance with further embodiments of the present invention.

A microphone circuit according to some embodiments of the present invention is illustrated in FIG. 3. The microphone 102 generates a microphone signal based on incident sound, which is converted to a digital signal by an analog-to-digital converter 300. The digital signal is provided to a summation unit 306, or combiner. The other microphone 104 generates a microphone signal that is converted to a digital signal by an analog-to-digital-converter 308. An adjustable delay unit 310 delays in time the digital signal from the microphone 104 relative to the digital signal from the microphone 102 by a predetermined delay value. The delayed digital signal is inverted by an inversion unit 304 and provided to the summation unit 306. The inverted delayed signal (by 310 and 304) is combined by the summation unit 306 with the digital signal from the analog to digital converter 300 to provide a combined microphone signal. The combined microphone signal is scaled by a scaling unit 312 and provided to a summation unit 314. A loudspeaker input signal that is provided to the loudspeaker 106 is also provided to a linear echo cancellation unit 316, inverted by an inversion unit 318, and provided to the summation unit 314. The linear echo cancellation unit 316 may be a finite impulse response (FIR) filter that reduces echo in the loudspeaker input signal in a well known manner. The summation unit 314 combines the scaled combined microphone signal with the inverted and filtered signal input signal to generate a delay command signal for the adjustable delay unit 310. The adjustable delay unit 310 delays the digital signal from the microphone 104 by a delay value that is based on the delay command signal. By inverting one of the microphone signals, and then combining the microphone signals, a directivity pattern is formed for the sensitivity of the two microphones 102 and 104.

The adjustable delay unit 310 may adjust, or steer, the directivity pattern by adding an adjustable time delay to the digital signal from the microphone 104 relative to the digital signal from the microphone 102. The adjustable delay unit 310 may adjust the delay added to the digital signal from the microphone 104 to reduce, or minimize, the delay value signal from the summation unit 314 (i.e., the combination of the loudspeaker input signal and the combined microphone signals). Accordingly, the relative delay between the microphone signals may be adjusted so as to reduce at least a portion of the loudspeaker output signal that is contributed to the combined microphone signal.

For example, with reference to FIG. 2, the microphone circuit 204 may adjust the sensitivity patterns 206 and 208, by adjusting the time delay added to the signals from the microphones 102 and 104, so that the direction of reduced sensitivity, which is illustrated by the notch axis 210, is in the direction of a portion of the incident signal (e.g., paths 200 and 202) from the loudspeaker 106.

Although FIGS. 1–3 illustrate a microphone circuit that includes two microphones, it would be understood by one having skill in the art that more than two microphones may be used in a similar manner. Accordingly, the present invention may be extended to embodiments of microphone circuits and other electronic devices that include two or more microphones. As will also be appreciated, the microphone signals may be analog signals and the microphone circuit 204 may adjust the relative phase and/or amplitude of the microphone signals.

FIG. 4 illustrates operations that may be used to adjust a directivity pattern created by two or more microphones in accordance with embodiments of the present invention. At block 402, a first microphone signal is generated from a first microphone. The first microphone signal includes a contribution that is associated with an output signal that is generated by a loudspeaker in response to an input signal. At block 404, a second microphone signal is generated from a second microphone. The second microphone signal includes a contribution that is associated with the output signal from the loudspeaker. At block 406, the first microphone signal is time delayed relative to the second microphone signal by a delay value. At block 408, the delayed first microphone signal is combined with the second microphone signal to provide a combined microphone signal. At block 408, the delay value is adjusted so as to reduce at least a portion of a contribution to the combined microphone signal associated with the output signal from the loudspeaker.

The delay value may be adjusted to steer a directivity pattern created by the first and second microphones based on a contribution to the combined microphone signal that is associated with the output signal from the loudspeaker. The delay value may be adjusted based on the input signal to the loudspeaker and the combined microphone signal.

According to various other embodiments of the present invention, at block 406, a transfer function, such as a finite impulse response (FIR) filter, is applied to at least one of the first and second microphone signals. Then, at block 410, the transfer function is adjusted based on the input signal to the loudspeaker and the combined microphone signal so as to reduce at least a portion of the contribution to the combined microphone signal associated with the output signal from the loudspeaker.

The flowchart of FIG. 4 illustrates the architecture, functionality, and operations of embodiments of the mobile terminal 100 hardware and/or software. In this regard, each block represents a module, segment, or portion of code, which comprises one or more executable instructions for implementing the specified logical function(s). It should also be noted that in other implementations, the function(s) noted in the blocks may occur out of the order noted in FIG. 4. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed is:

1. A method of operating a microphone circuit, comprising:
    generating a first microphone signal via a first microphone, the first microphone signal including a contribution associated with an output signal that is generated by a loudspeaker in response to an input signal;
    generating a second microphone signal via a second microphone, the second microphone signal including a contribution associated with the output signal from the loudspeaker;
    delaying the second microphone signal by a delay value;
    combining the delayed second microphone signal with the first microphone signal to provide a combined microphone signal; and
    adjusting the delay value based on the input signal to the loudspeaker and the combined microphone signal so as to reduce at least a portion of the contribution to the combined microphone signal associated with the output signal from the loudspeaker, wherein adjusting the delay value comprises:

removing at least a portion of the input signal to the loudspeaker from the combined microphone signal to provide a difference signal; and adjusting the delay value based on the difference signal.

2. The method of claim 1, wherein combining the delayed second microphone signal with the first microphone signal comprises removing at least a portion of one of the first and second microphone signals from the other one of the first and second microphone signals.

3. The method of claim 1, wherein adjusting the delay value based on the difference signal comprises adjusting the delay value to minimize the contribution to the combined microphone signal associated with the output signal from the loudspeaker.

4. The method of claim 1, wherein adjusting the delay value comprises adjusting a directivity pattern created by the first and second microphones based on a contribution to the combined microphone signal associated with the output signal from the loudspeaker.

5. The method of claim 1, wherein removing at least a portion of the input signal to the loudspeaker from the combined microphone signal to provide a difference signal comprises:

inverting the loudspeaker input signal; and summing the inverted loudspeaker input signal and the combined microphone signal to provide the difference signal.

6. The method of claim 1, wherein removing at least a portion of the input signal to the loudspeaker from the combined microphone signal to provide a difference signal comprises:

inverting the combined microphone signal; and summing the inverted combined microphone signal and the loudspeaker input signal to provide the difference signal.

7. A microphone circuit comprising:

a first microphone that is configured to generate a first microphone signal, the first microphone signal including a contribution associated with an output signal that is generated by a loudspeaker in response to an input signal;

a second microphone that is configured to generate a second microphone signal, the second microphone signal including a contribution associated with the output signal from the loudspeaker;

an adjustable delay unit that is configured to adjustably delay the second microphone signal by a delay value; and a combiner that is configured to combine the delayed second microphone signal and the first microphone signal to provide a combined microphone signal, and wherein the adjustable delay unit is further configured to adjust the delay value so as to reduce at least a portion of a contribution to the combined microphone signal associated with the output signal from the loudspeaker, wherein the adjustable delay unit is further configured to sense the input signal to the loudspeaker, and to remove at least a portion of the sensed input signal from the combined microphone signal to provide a difference signal, and to adjust the delay value based on the difference signal.

8. The microphone circuit of claim 7, further comprising:

an inversion unit that is configured to invert the input signal to the loudspeaker; and a summation unit that is configured to sum the inverted input signal and the combined microphone signal to provide the difference signal.

9. The microphone circuit of claim 7, further comprising:

an inversion unit that is configured to invert the combined microphone signal; and a summation unit that is configured to sum the inverted combined microphone signal and the input signal to the loudspeaker to provide the difference signal.

10. The microphone circuit of claim 7, wherein the combiner is further configured to remove at least a portion of one of the first and second microphone signals from the other one of the first and second microphone signals.

11. The microphone circuit of claim 7, wherein the adjustable delay unit is further configured to adjust the delay value so as to minimize the contribution to the combined microphone signal associated with the output signal from the loudspeaker.

12. The microphone circuit of claim 7, wherein the adjustable delay unit is further configured to adjust a directivity pattern created by the first and second microphones based on a contribution to the combined microphone signal associated with the output signal from the loudspeaker.

13. A computer program product configured to operate a microphone device, comprising:

a computer readable storage medium having computer readable program code embodied therein, the computer readable program code comprising:

computer readable program code for adjustably delaying a second microphone signal from a second microphone by a delay value;

computer readable program code for combining the delayed second microphone signal with a first microphone signal from a first microphone to provide a combined microphone signal, the first and second microphone signals including contributions associated with an output signal that is generated by a loudspeaker in response to an input signal;

computer readable program code for adjusting the delay value so as to reduce at least a portion of a contribution to the combined microphone signal associated with the output signal from the loudspeaker; and computer readable program code for adjusting the delay value based on the input signal to the loudspeaker and the combined microphone signal by removing at least a portion of the input signal to the loudspeaker from the combined microphone signal to provide a difference signal, and adjusting the delay value based on the difference signal.

* * * * *